US008254059B2

(12) United States Patent
Horide et al.

(10) Patent No.: US 8,254,059 B2
(45) Date of Patent: Aug. 28, 2012

(54) PERPENDICULAR MAGNETIC RECORDING HEAD WITH DOMAIN CONTROLLED SIDE SHIELD

(75) Inventors: Tomoya Horide, Odawara (JP); Kimitoshi Etoh, Odawara (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 24 days.

(21) Appl. No.: 12/961,421

(22) Filed: Dec. 6, 2010

(65) Prior Publication Data
US 2012/0140356 A1 Jun. 7, 2012

(51) Int. Cl.
G11B 5/127 (2006.01)

(52) U.S. Cl. .................................. 360/125.03

(58) Field of Classification Search .......... 360/125.03–125.15, 125.33
See application file for complete search history.

(56) References Cited

U.S. PATENT DOCUMENTS

| | | | |
|---|---|---|---|
| 6,813,115 B2 | 11/2004 | Van der Heijden et al. | |
| 7,075,756 B1 | 7/2006 | Mallary et al. | |
| 7,239,478 B1 | 7/2007 | Sin et al. | |
| 7,295,401 B2 | 11/2007 | Jayasekara et al. | |
| 7,397,632 B2 | 7/2008 | Miyake et al. | |
| 7,565,732 B2 | 7/2009 | Le et al. | |
| 7,573,683 B1* | 8/2009 | Benakli et al. ............... | 360/319 |
| 7,599,151 B2 | 10/2009 | Hatatani et al. | |
| 7,715,152 B2 | 5/2010 | Okada et al. | |
| 7,982,996 B2* | 7/2011 | Smith et al. ................. | 360/59 |
| 8,040,633 B2* | 10/2011 | Kaizu et al. ................. | 360/135 |
| 2005/0068669 A1 | 3/2005 | Hsu et al. | |
| 2005/0068678 A1 | 3/2005 | Hsu et al. | |
| 2005/0134988 A1* | 6/2005 | Nakamura et al. ........... | 360/55 |
| 2007/0247748 A1 | 10/2007 | Ikeda et al. | |
| 2009/0109570 A1* | 4/2009 | Scholz et al. ................ | 360/129 |
| 2009/0154013 A1* | 6/2009 | Sugiyama et al. ........... | 360/125.3 |
| 2009/0168241 A1* | 7/2009 | Mochizuki et al. ......... | 360/125.03 |
| 2010/0091413 A1 | 4/2010 | Nunokawa et al. | |
| 2010/0157472 A1 | 6/2010 | Hsiao et al. | |
| 2010/0214692 A1* | 8/2010 | Kief et al. ................... | 360/125.03 |
| 2011/0007428 A1* | 1/2011 | Batra et al. ................. | 360/319 |
| 2011/0102936 A1* | 5/2011 | Sugiyama et al. ............ | 360/75 |

FOREIGN PATENT DOCUMENTS

JP 2000/315302 A 11/2000

OTHER PUBLICATIONS

Kim et al., "Optimal Side Shield Write Head Design for Ultra-High Recording Density," IEEE Transactions on Magnetics, vol. 44, No. 11, Nov. 2008, p. 3591-3593, abstract only.

* cited by examiner

Primary Examiner — Angel A. Castro
(74) Attorney, Agent, or Firm — Zilka-Kotab, PC

(57) ABSTRACT

In one embodiment, a perpendicular magnetic head includes a main magnetic pole, a trailing shield, and a multilayered side/leading shield disposed on a leading side of the main magnetic pole in a down-track direction and on either side of the main magnetic pole in a cross-track direction. The side/leading shield includes an inner layer nearer to the main magnetic pole which surrounds the main magnetic pole on three sides and an outer layer farther from the main magnetic pole than the inner layer which surrounds the main magnetic pole and inner layer on three sides. The inner layer has a saturation magnetization (Ms) that is greater than a Ms of the outer layer, and the trailing shield has a relative permeability of greater than about 50. Other magnetic heads and methods of producing magnetic heads are also presented according to various embodiments.

25 Claims, 14 Drawing Sheets

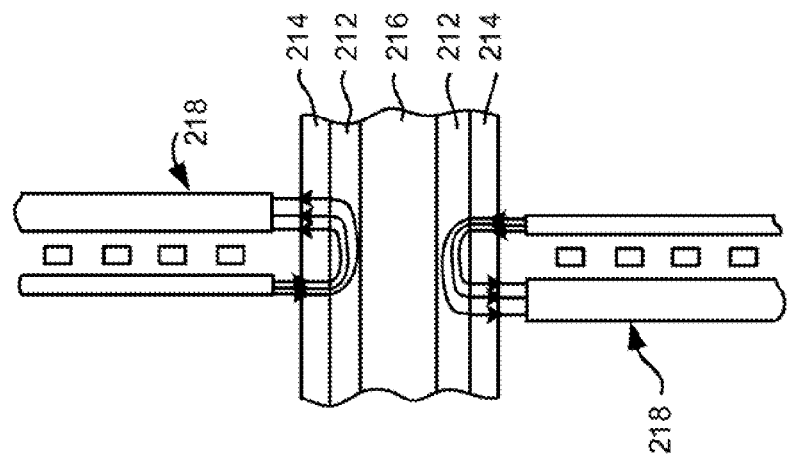
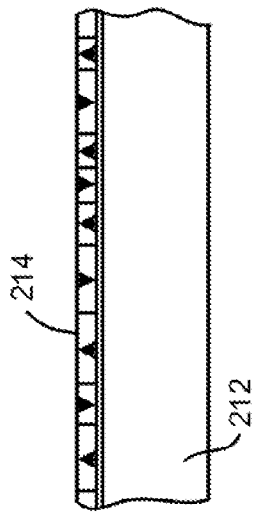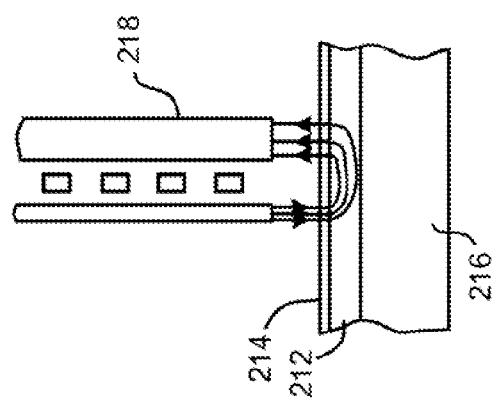
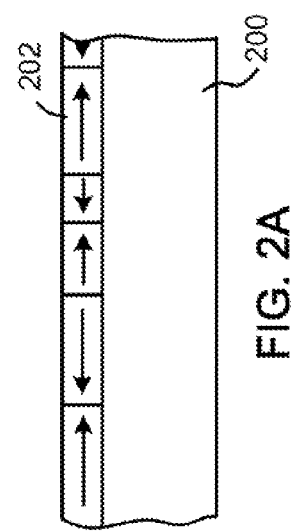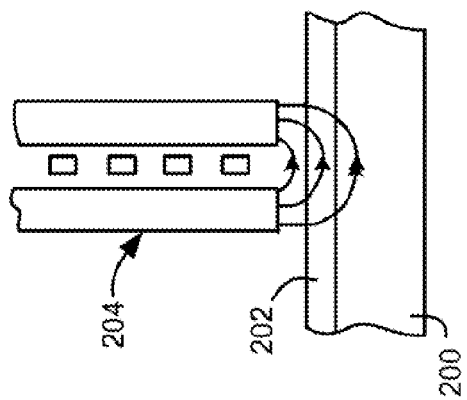

PERPENDICULAR MAGNETIC RECORDING HEAD WITH DOMAIN CONTROLLED SIDE SHIELD

FIELD OF THE INVENTION

The present invention relates to data storage systems, and more particularly, this invention relates to a perpendicular magnetic recording head with a side shield having a high trailing shield permeability.

BACKGROUND OF THE INVENTION

The heart of a computer is a magnetic hard disk drive (HOD) which typically includes a rotating magnetic disk, a slider that has read and write heads, a suspension arm above the rotating disk, and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. Shields for the magnetic recording head of an HDD play a vital role in ensuring high recording densities. Trailing shields have been introduced to improve the magnetic gradient in the down-track direction, with side shields introduced to suppress the spread of magnetic fields in the cross-track direction. In such recording heads, improvement of the magnetic gradient is crucial in enabling high density magnetic recording.

In order to improve the signal-to-noise ratio (SNR) in HDDs, attempts have been made at improving the field gradient of perpendicular magnetic write heads. One such attempt has focused on increasing the permeability of the trailing shield of the magnetic head. However, with an increased areal density, the pole width of the write head generally decreases. A decrease in the width of the write head causes the permeability of the trailing shield to degrade, since a field applied region is reduced and the exchange field increases. This in turn reduces the field gradient of a magnetic head having a narrow track width. Therefore, it would beneficial to have a trailing shield with an increased permeability to counter this reduction due to narrow track width.

SUMMARY OF THE INVENTION

In one embodiment, a perpendicular magnetic head includes a main magnetic pole, a trailing shield, a multilayered side shield disposed on either side of the main magnetic pole in a cross-track direction, the side shield including an inner layer nearer to the main magnetic pole and an outer layer farther from the main magnetic pole than the inner layer, with the inner layer having a saturation magnetization (Ms) that is greater than a Ms of the outer layer, and the trailing shield having a relative permeability of greater than about 50.

In another embodiment, a perpendicular magnetic head includes a main magnetic pole, a trailing shield, and a multi-layered side/leading shield disposed on a leading side of the main magnetic pole in a down-track direction and on either side of the main magnetic pole in a cross-track direction. The side/leading shield includes an inner layer nearer to the main magnetic pole which surrounds the main magnetic pole on three sides and an outer layer farther from the main magnetic pole than the inner layer which surrounds the main magnetic pole and inner layer on three sides. The inner layer has a saturation magnetization (Ms) that is greater than a Ms of the outer layer, and the trailing shield has a relative permeability of greater than about 50.

In yet another embodiment, a perpendicular magnetic head includes a main magnetic pole, a trailing shield, and a multi-layered side shield having more than two layers such that a layer nearer to the main magnetic pole has a saturation magnetization (Ms) that is greater than a Ms of a layer farther from the main magnetic pole. A ratio of a width (W) in a cross-track direction of a portion of the layer nearer to the main magnetic pole that is disposed on either side of the main magnetic pole over a height (H) in a down-track direction of the portion of the layer nearer to the main magnetic pole that is disposed on either side of the main magnetic pole is no more than about 2.0 (W/H$\leq$~2.0), and the trailing shield has a relative permeability of greater than about 50.

According to another embodiment, a method of forming a perpendicular magnetic head includes forming side gap layers separated from each other on a substrate, forming an outer side shield in a gap provided between the side gap layers, forming a groove in a central portion of the outer side shield, forming an inner side shield in the groove of the outer side shield, and forming a groove in a central portion of the inner side shield. The inner and outer side shields act as a side/leading shield, and the inner side shield has a saturation magnetization (Ms) that is greater than a Ms of the outer side shield.

In another embodiment, a method of forming a perpendicular magnetic head includes forming two side gap layers separated from each other on a substrate, forming two outer side shields adjacent the side gap layers in a gap provided between the side gap layers, forming two inner side shields near the outer side shields, forming a main magnetic pole between the inner side shields, and forming a trailing shield above the main magnetic pole, the inner side shield, and the outer side shield. The trailing shield has a relative permeability of greater than about 50, a ratio of a width (W) in a cross-track direction of the inner side shield that is disposed on either side of the main magnetic pole over a height (H) in a down-track direction of the inner side shield that is disposed on either side of the main magnetic pole is no more than about 1.0 (W/H$\leq$~1.0), and a ratio of an Ms of the outer side shield (OMs) over an Ms of the inner side shield (IMs) is no more than about 0.5 (OMs/IMs$\leq$~0.5).

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

Figure 1:
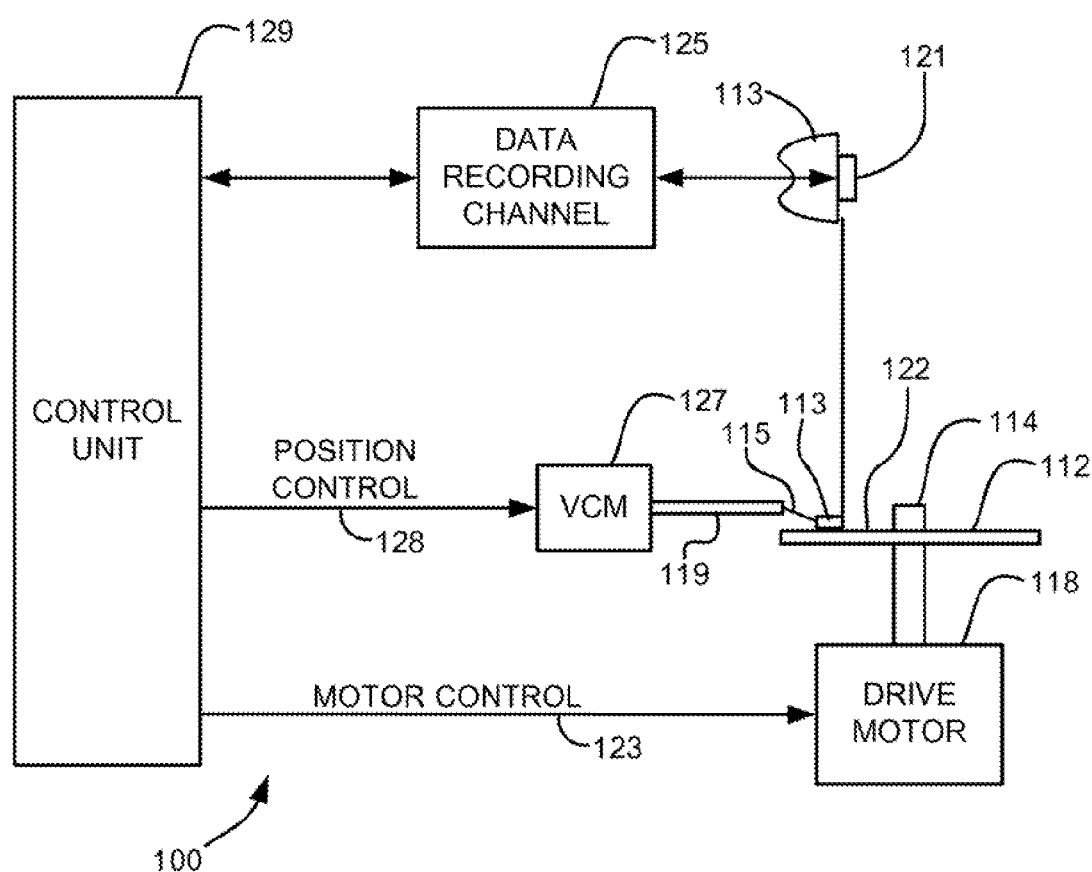
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a perpendicular magnetic head includes a main magnetic pole, a trailing shield, a multilayered side shield disposed on either side of the main magnetic pole in a cross-track direction, the side shield including an inner layer nearer to the main magnetic pole and an outer layer farther from the main magnetic pole than the inner layer, with the inner layer having a saturation magnetization (Ms) that is greater than a Ms of the outer layer, and the trailing shield having a relative permeability of greater than about 50.

In another general embodiment, a perpendicular magnetic head includes a main magnetic pole, a trailing shield, and a multilayered side/leading shield disposed on a leading side of the main magnetic pole in a down-track direction and on either side of the main magnetic pole in a cross-track direction. The side/leading shield includes an inner layer nearer to the main magnetic pole which surrounds the main magnetic pole on three sides and an outer layer farther from the main magnetic pole than the inner layer which surrounds the main magnetic pole and inner layer on three sides. The inner layer has a saturation magnetization (Ms) that is greater than a Ms of the outer layer, and the trailing shield has a relative permeability of greater than about 50.

In yet another general embodiment, a perpendicular magnetic head includes a main magnetic pole, a trailing shield, and a multilayered side shield having more than two layers such that a layer nearer to the main magnetic pole has a saturation magnetization (Ms) that is greater than a Ms of a layer farther from the main magnetic pole. A ratio of a width (W) in a cross-track direction of a portion of the layer nearer to the main magnetic pole that is disposed on either side of the main magnetic pole over a height (H) in a down-track direction of the portion of the layer nearer to the main magnetic pole that is disposed on either side of the main magnetic pole is no more than about 2.0 (W/H≦~2.0), and the trailing shield has a relative permeability of greater than about 50.

According to another general embodiment, a method of forming a perpendicular magnetic head includes forming side gap layers separated from each other on a substrate, forming an outer side shield in a gap provided between the side gap layers, forming a groove in a central portion of the outer side shield, forming an inner side shield in the groove of the outer side shield, and forming a groove in a central portion of the inner side shield. The inner and outer side shields act as a side/leading shield, and the inner side shield has a saturation magnetization (Ms) that is greater than a Ms of the outer side shield.

In another general embodiment, a method of forming a perpendicular magnetic head includes forming two side gap layers separated from each other on a substrate, forming two outer side shields adjacent the side gap layers in a gap provided between the side gap layers, forming two inner side shields near the outer side shields, forming a main magnetic pole between the inner side shields, and forming a trailing shield above the main magnetic pole, the inner side shield, and the outer side shield. The trailing shield has a relative permeability of greater than about 50, a ratio of a width (W) in a cross-track direction of the inner side shield that is disposed on either side of the main magnetic pole over a height (H) in a down-track direction of the inner side shield that is disposed on either side of the main magnetic pole is no more than about 1.0 (W/H≦~1.0), and a ratio of an Ms of the outer side shield (OMs) over an Ms of the inner side shield (IMs) is no more than about 0.5 (OMs/IMs≦~0.5).

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 11.3 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3B:
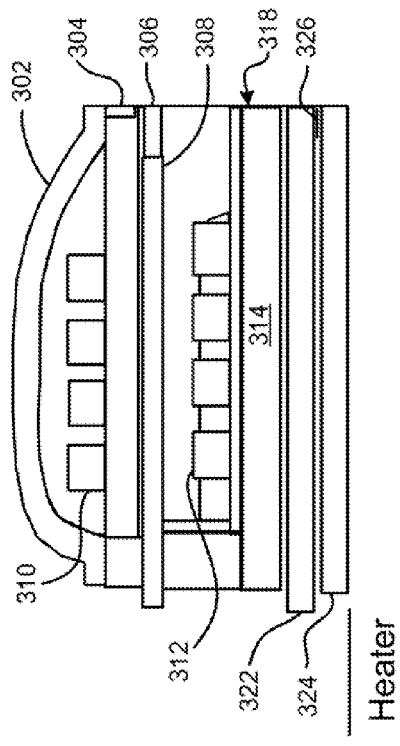
FIG. 3B is a cross-sectional view of one particular embodiment of a piggyback magnetic head with helical coils.
Figure 3A:
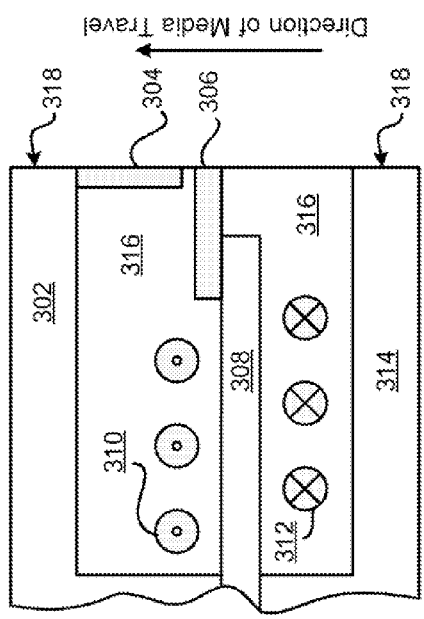
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4B:
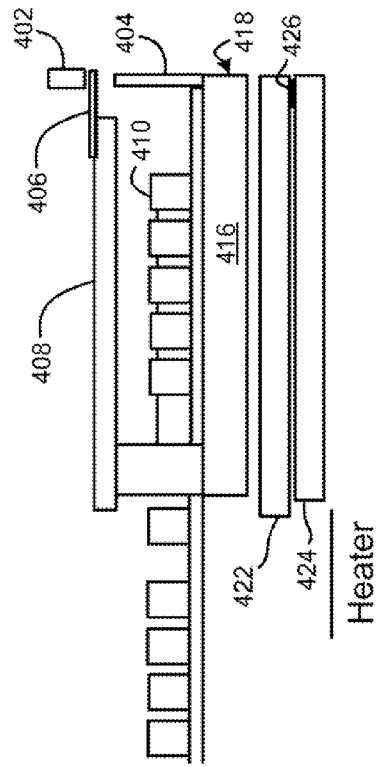
FIG. 4B is a cross-sectional view of one particular embodiment of a piggyback magnetic head with looped coils.
Figure 4A:
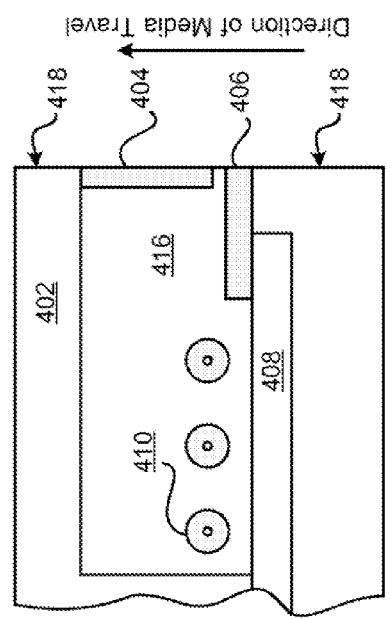
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Referring to FIGS. 3A, 3B, 4A, and 4B, some of the embodiments described herein are directed toward the trailing shield (304, FIGS. 3A, 3B) (404, FIGS. 4A, 4B); accordingly, the representation of the trailing shield in the above figures is for reference only, and is not meant to be limiting on the invention in any way.

In a trailing shield (304, FIGS. 3A, 3B) (404, FIGS. 4A, 4B), the magnetic domain spreads out from the portion directly above the main magnetic pole (306, FIGS. 3A, 3B) (406, FIGS. 4A, 4B). This type of magnetization distribution occurs because magnetization of the trailing shield is driven by a local magnetic field caused by the main magnetic pole. The portion directly above the main magnetic pole where the magnetic domain is formed functions as a trailing shield.

Figure 5A:
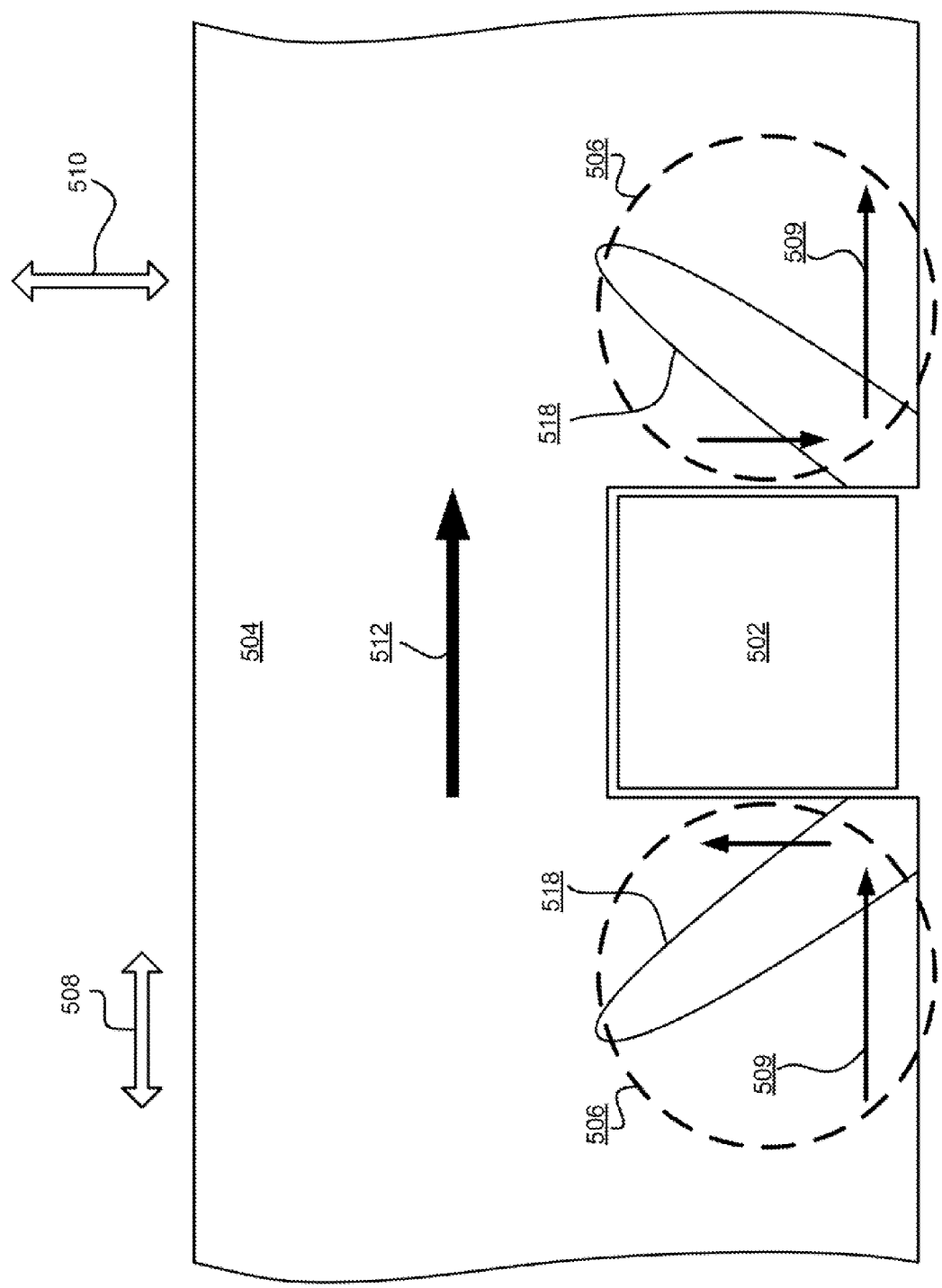
FIG. 5A is a schematic diagram of an air bearing surface view of a magnetic head in one example.

FIG. 5A illustrates the magnetization distribution for the residual magnetized state in a side shield (as indicated by the circles 506 on either side of the main magnetic pole 502). The width of the shield in the cross-track direction 508 has an extremely long anisotropic shape. Thus the magnetization in the shield is directed toward the cross-track direction 508 except for in the vicinity of the main magnetic pole 502 due to the shape magnetic anisotropy.

As shown in FIG. 5A, the magnetization of the side shield 506 facing the cross-track direction provides a static magnetic field 512 in the cross-track direction to the portion directly above the main magnetic pole 502 of the trailing shield 504 (as indicated by arrow 512). A magnetic charge exists in the region 518 between the magnetic domain 509 in the cross-track direction (as indicated by arrow 508) and the magnetic domain alongside the main magnetic pole 502 in the down-track direction (as indicated by arrow 510). The cross-track component of the static magnetic field which the trailing shield 504 receives from the side shields in each position is also important. The static magnetic field obstructs the action of the magnetization vector of the part of the trailing shield 504 directly above the main magnetic pole 502, causing the permeability of the trailing shield 504 to deteriorate. The cross-track component of the magnetic field 512 (Hz) at the portion directly above the main magnetic pole 502 of the trailing shield 504 in one test sample was 730 Oe in a conventional magnetic head. The relative permeability of the trailing shield is given by 24000/Hz for a trailing shield 504 having a saturation magnetic flux density of 2.4 T. Therefore, the permeability at Hz=730 Oe can be estimated at a relative permeability of around 30.

Figure 5B:
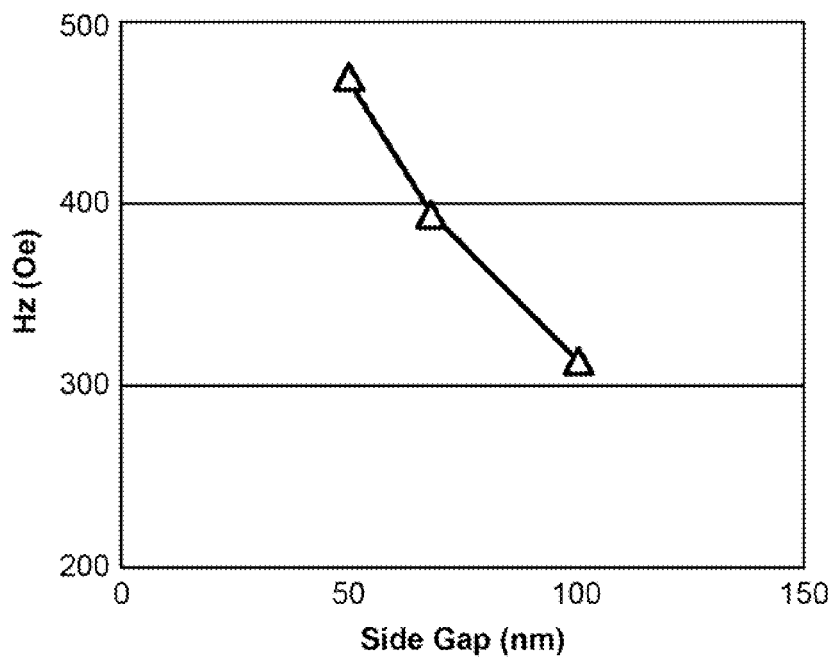
FIG. 5B is a plot of intrinsic magnetic field versus side gap width in one example.

In contrast, as shown in FIG. 5B, a structure having a larger side gap resulted in a smaller Hz in the trailing shield induced by the side shield. Accordingly, by producing structures with larger side gaps, the Hz may be reduced, according to one embodiment.

Figure 5C:
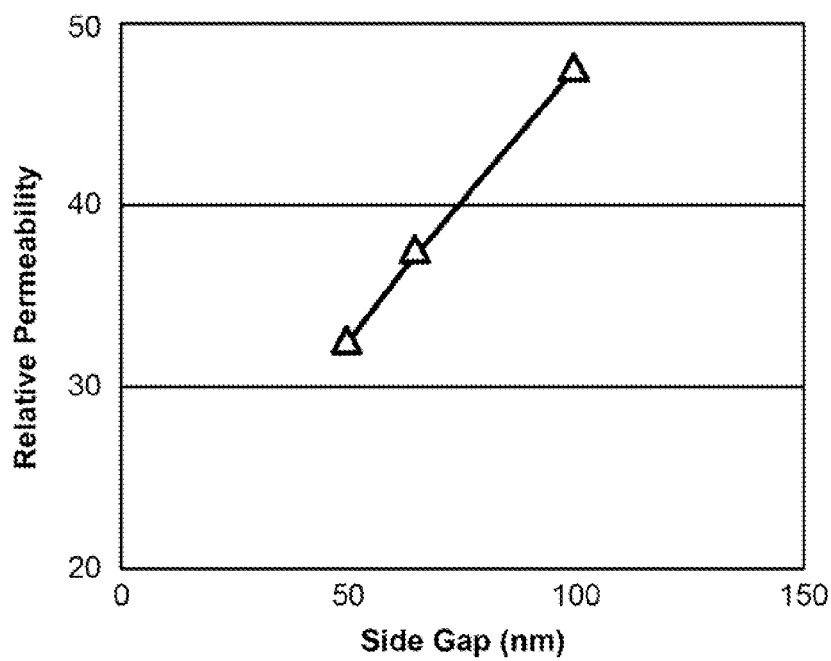
FIG. 5C is a plot of permeability versus side gap width in one example.

FIG. 5C illustrates the dependency of permeability on the side gap width. Where the side gap is small, the side shield approaches the portion directly above the trailing shield, and the magnetic field which fixes the trailing shield increases. In this way the permeability reduces with the reduction in the side gap. As the side gap is small for a high-density magnetic recording head, this means that the problem of reduction in the trailing shield permeability is difficult to achieve, since a large side gap is not easily achieved in high-density magnetic recording heads.

FIGS. 5B-5C suggest that the magnetic gradient will be significantly reduced in a conventional head that is designed to be used in high density magnetic recording. This is because with a conventional structure, a deterioration in the permeability of the trailing shield will occur due to the magnetization distribution of the side shield. Reduction in permeability leads to reduction in the magnetic gradient, which is a major problem in achieving high-density magnetic recording.

Typically, the intrinsic magnetic field (Hi) in a trailing shield, such as an anisotropic magnetic field, degrades the permeability of the trailing shield, since permeability is generally proportional to 1/Hi. Therefore, according to some embodiments, Hi may be reduced to improve the permeability of the trailing shield.

Referring again to FIG. 5A, in side-shield-domains 506, magnetic charge parallel to a cross-track direction (as indicated by arrow 508) is not cancelled out around the main pole 502 of a magnetic head. Therefore, Hi (=Hz) is induced above the main pole 502 by the uncancelled magnetic charge at region 518 in the side-shield domains 506. Here, Hi=Hz in the shield having a side shield, and other shield arrangements are possible and may not have the same relationship.

In order to reduce Hi, magnetization in the side-shield-domains 506 may be adjusted, in some approaches. Hi is generated by magnetization in the side-shield-domains 506 parallel to the cross-track direction 508. The magnetization in the side-shields-domains 506 may be made to be parallel to a down-track direction (as indicated by arrow 510) for a reduction in Hi, in one approach.

Figure 5D:
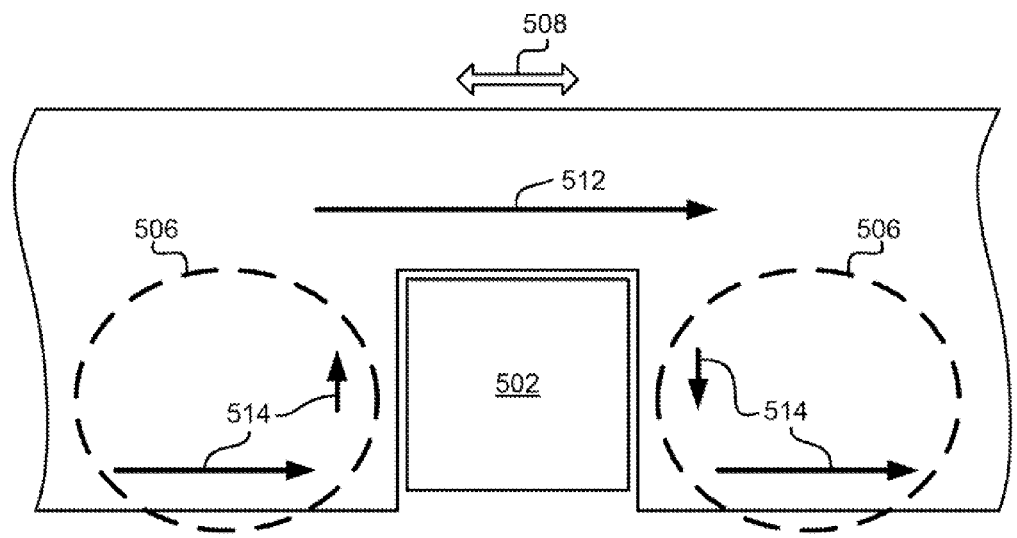
FIG. 5D is a schematic diagram of an air bearing surface view of a magnetic head in one example.
Figure 5E:
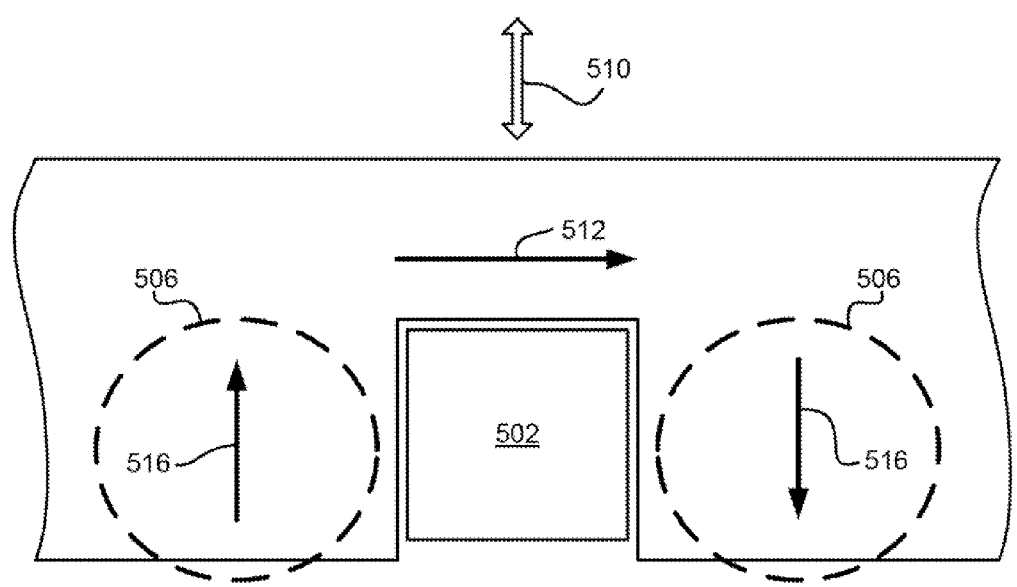
FIG. 5E is a schematic diagram of an air bearing surface view of a magnetic head in one example.

Now referring to FIG. 5D, side shield domains 506 with magnetization (indicated by arrows 514) parallel and non-parallel to the cross track direction 508 are shown, according to one embodiment. As can be seen from FIG. 5D, the magnetization in the cross-track direction 508 (since it is not cancelled out) may cumulate to induce an unwanted magnetic field 512. However, as shown in FIG. 5E, the induced portion of this magnetic, field 512 may be reduced (or eliminated) by adjusting the side shield domains 506 to have magnetization 516 parallel to a down-track direction 510, thereby reducing the induced magnetic field 512.

To maintain a high permeability of the trailing shield in a high-density magnetic recording head, according to some embodiments, the magnetic field which fixes the magnetization of the trailing shield may be reduced by controlling the direction of magnetization of the side shields.

For example, the permeability of the trailing shield may be improved by removing the magnetic field which fixes the magnetization of the portion immediately above the main magnetic pole by controlling the magnetization distribution of the side shields. Also, in some approaches, the side shields may have a structure that includes magnetic materials (but which may also include non-magnetic materials) and is laminated so as to flank the main magnetic pole on multiple sides. In one approach, the direction of lamination may cause positive effects on the structure. Furthermore, the magnitude of the relationship of the saturated magnetic flux density is improved, in some embodiments.

In order to reduce the magnetization in the cross-track direction of the side-shield-domains, several structures are presented below, according to various embodiments.

Using some embodiments described herein, relative permeability in the trailing shield of greater than about 50 may be achieved. In some other embodiments, relative permeability of greater than about 100 may be achieved. As used herein, the term "about" when used in reference to a value means that value±10% of the value, e.g., "about 50" means 50±5.

Figure 6A:
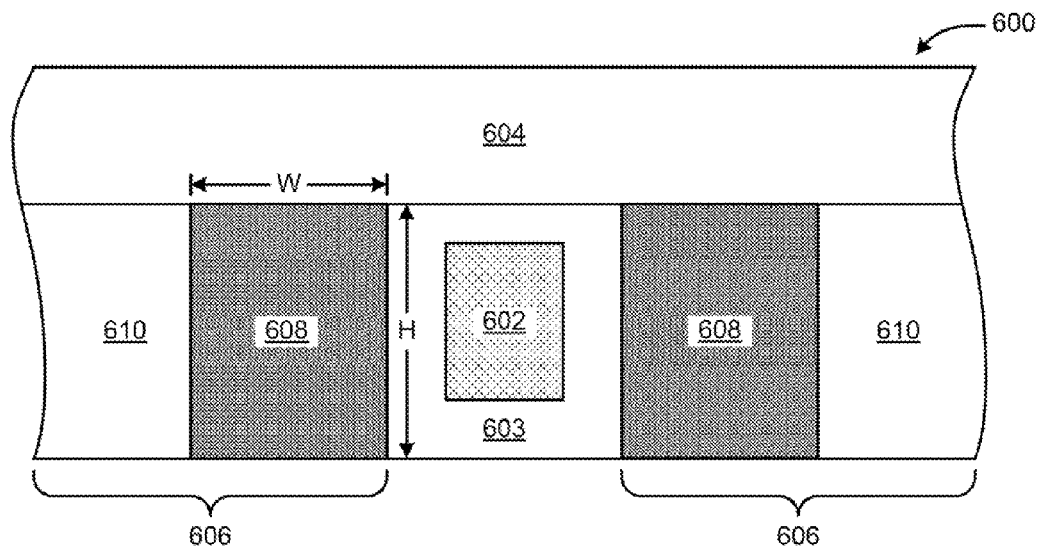
FIG. 6A is a schematic diagram of an air bearing surface view of a magnetic head with multilayered side shields, according to one embodiment.
Figure 6B:
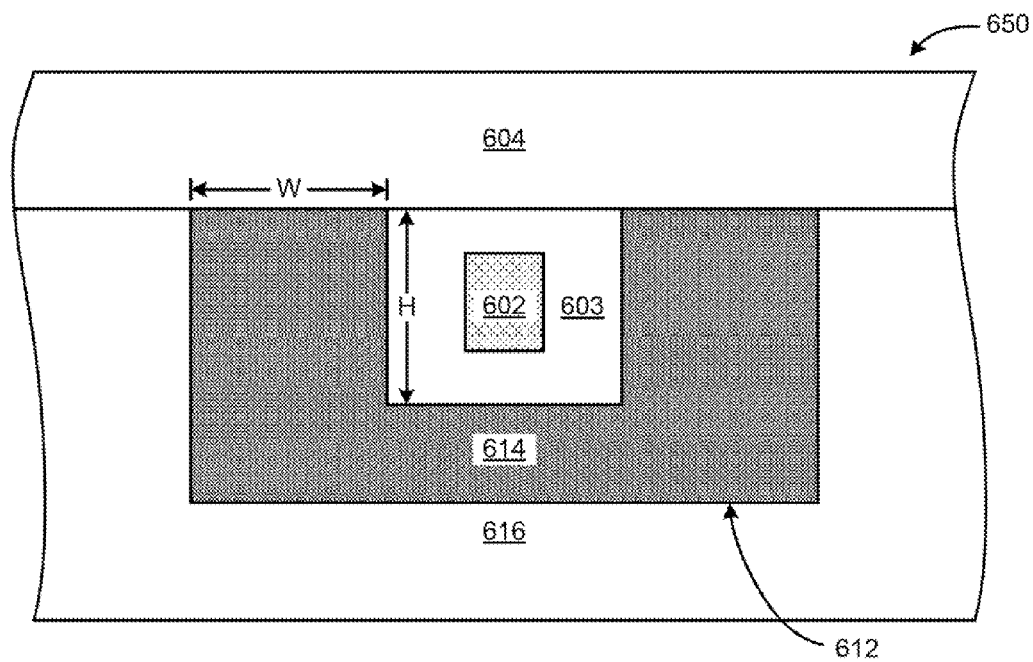
FIG. 6B is a schematic diagram of an air bearing surface view of a magnetic head with multilayered side/leading shields, according to one embodiment.

Referring to FIG. 6A, an air bearing surface view of a structure 600 is shown having a magnetic pole 602, a side gap 603 (which may also provide a trailing and/or leading gap, as shown in FIGS. 6A-6B), a trailing shield 604, and side shields 606, according to one embodiment. The side shields 606 may include a multilayered structure which comprises multiple layers, such as an inner layer 608 and an outer layer 610 (at least two layers, but possibly more in an alternating arrangement, such as four, six, eight, 20, etc., as would be apparent to one of skill in the art upon reading the present descriptions). The multiple layers 608, 610 may be preferably comprised of materials having a different saturation magnetization (Ms) in an orientation where the inner layer 608 has a higher Ms than the outer layer 610, in one approach.

In one embodiment, the inner layer 608 may be comprised of a higher saturated magnetic flux density (Bs) magnetic material, while the outer layer 610 may be comprised of a lower Bs magnetic material or a non-magnetic material, of types known to one of skill in the art.

In addition, in one embodiment, the width W of the inner layer 608 divided by the height H of the inner layer 608 may preferably be less than or equal to about 1.0 (W/H≦~1.0). In another embodiment, a ratio of the Bs of the outer layer 610 (OBs) divided by the Bs of the inner layer 608 (IBs) may preferably be less than or equal to about 0.5 (OBs/IBs≦~0.5).

According to another embodiment (not shown) the inner layer 608 may be separated from the trailing shield 604 by a portion of the outer layer 610.

Now referring to FIG. 6B, according to another embodiment, a structure 650 may include a magnetic pole 602, a side gap 603 (which may also provide a trailing and/or leading gap, as shown in FIGS. 6A-6B), a trailing shield 604, and multilayered side/leading shield 612. The multilayered side/leading shield 612 may include multiple layers, such as an inner layer 614 and an outer layer 616 (at least two layers, but possibly more in an alternating arrangement, such as three, four, six, eight, 20, etc., as would be apparent to one of skill in the art upon reading the present descriptions). The multiple layers 614, 616 may be preferably comprised of materials having a different saturation magnetization (Ms) in an orientation where the inner layer 614 has a higher Ms than the outer layer 616, in one approach.

In one embodiment, the inner layer 614 may be comprised of a higher saturated magnetic flux density (Bs) magnetic material, while the outer layer 616 may be comprised of a lower Bs magnetic material or a non-magnetic material, of types known to one of skill in the art.

In addition, in one embodiment, the width W of a side shield portion of the inner layer 614 divided by the height H of a side shield portion of the inner layer 614 may preferably be less than or equal to about 2 (W/H≦~2). In another embodiment, ratio of the Bs of the outer layer 616 (OBs) divided by the Bs of the inner layer 614 (IBs) may preferably be less than or equal to about 0.8 (OBs/IBs≦~0.8).

According to another embodiment (not shown) the inner layer 614 may be separated from the trailing shield 604 by a portion of the outer layer 616.

Due in part to the different saturation magnetizations of the inner and outer layers of the side/leading shield 612, a reverse magnetic field may be generated at the interface between the inner layer 614 and the outer layer 616 forming a magnetic vortex structure.

Figure 6C:
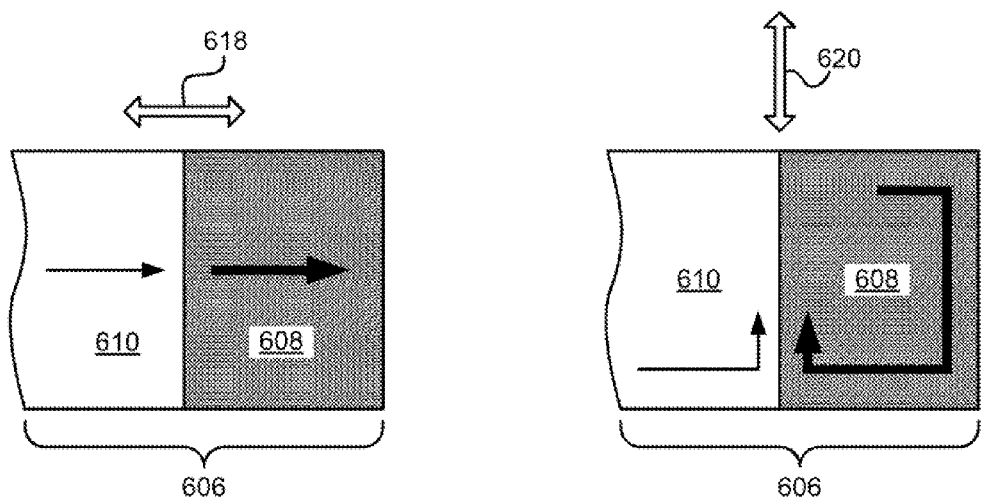
FIG. 6C is a detailed view of side shields from FIG. 6A, according to one embodiment.

Now referring to FIG. 6C, which is a detailed view of the side shields 606 in FIG. 6A, an effect of the structure 600 of FIG. 6A is shown according to one embodiment. Referring again to FIG. 6C, in conventional structures, there would be a charge imbalance in the side shields 606, since the magnetization is in a direction parallel to the cross-track direction 618. This would result in a large demagnetization field, which is undesired. Due in part to the different saturation magnetizations of the inner and outer layers of the side shield 606, a reverse magnetic field may be generated at the interface between the inner layer 608 and the outer layer 610 forming a magnetic vortex structure. Therefore, in the structure 600, due to the magnetization of the multilayered side shields 606 being in a direction parallel to the down-track direction 620, the charge balance is suppressed, and there is only a small resulting demagnetization field, which thereby results in a small Hi. This is desirable in order to improve the permeability of the trailing shield 604, which is proportional to 1/Hi, according to some approaches.

Figure 6D:
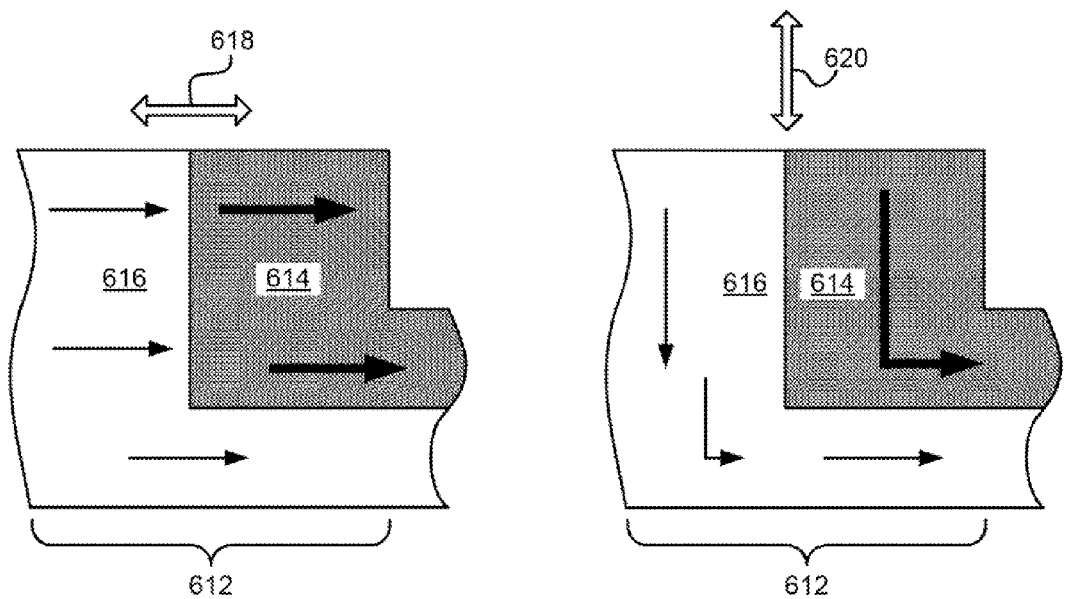
FIG. 6D is a detailed view of side shields from FIG. 6B, according to one embodiment.

Now referring to FIG. 6D, which is a detailed view of the side/leading shield 612 in FIG. 6B, an effect of the structure 650 is shown according to one embodiment. Referring again to FIG. 6D, in conventional structures, there is a charge imbalance in the side/leading shields 612, since the magnetization is in a direction parallel to the cross-track direction 618. This results in a large demagnetization field, which is undesired. Due in part to the different saturation magnetizations of the inner and outer layers of the side/leading shield 612, a reverse magnetic field may be generated at the interface between the inner layer 614 and the outer layer 616 forming a closure domain that surrounds the main magnetic pole. Therefore, in the structure 650, due to the magnetization of the multilayered side/leading shield 612 being in a direction parallel to the down-track direction 620, the charge balance is suppressed, and there is only a small resulting demagnetization field, which thereby results in a small Hi. This is desirable in order to improve the permeability of the trailing shield 604, which is proportional to 1/Hi, according to some approaches.

Figure 6E:
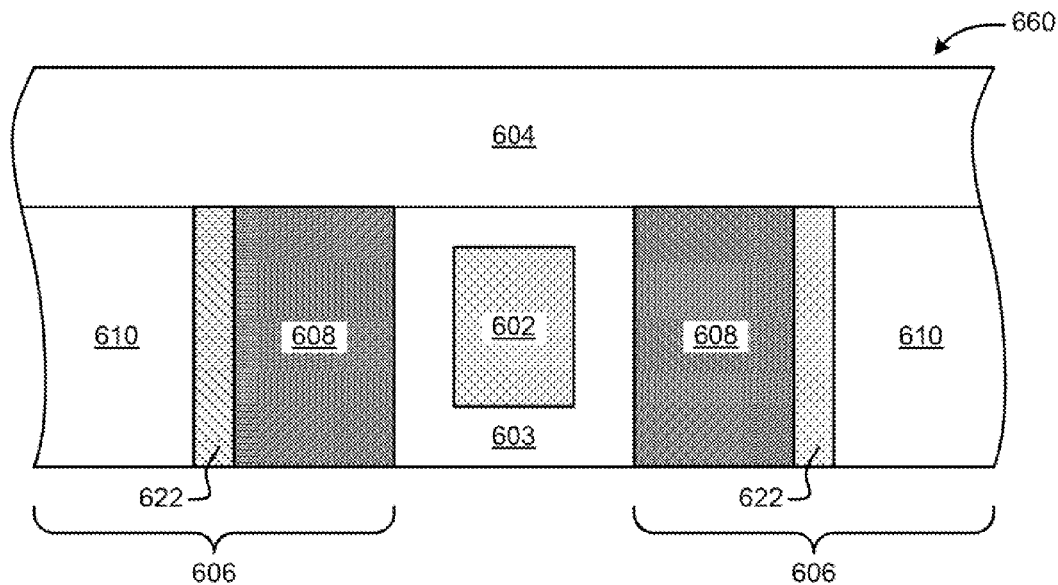
FIG. 6E is a schematic diagram of an air bearing surface view of a magnetic head with multilayered side shields, according to one embodiment.
Figure 6F:
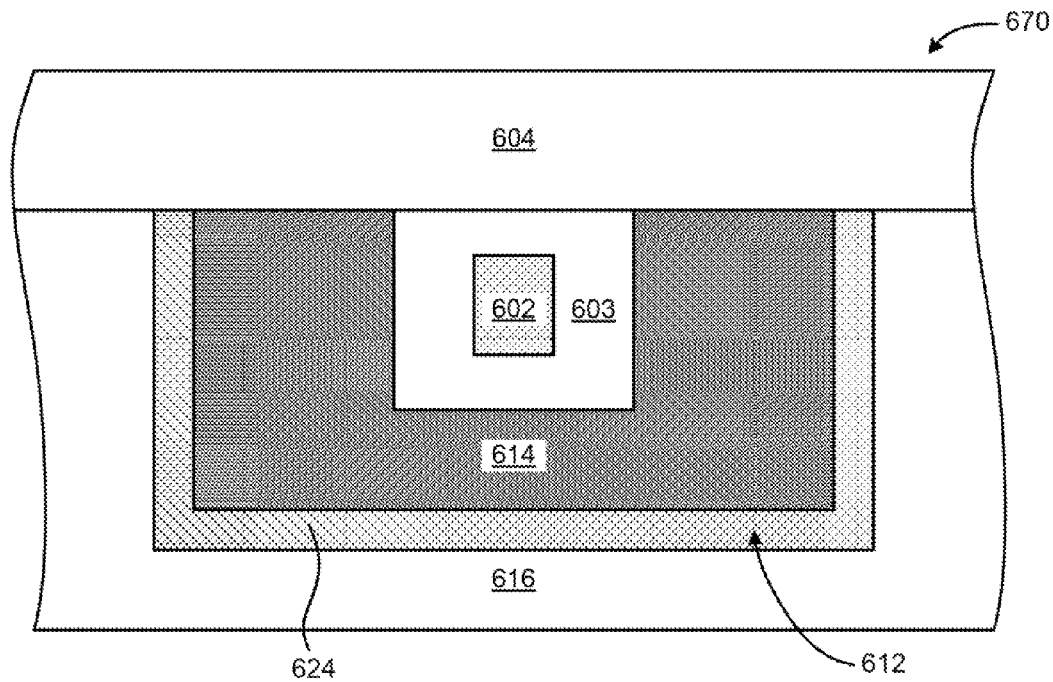
FIG. 6F is a schematic diagram of an air bearing surface view of a magnetic head with multilayered side/leading shields, according to one embodiment.

Referring to FIG. 6E, a structure 660 is shown having a magnetic pole 602, a side gap 603 (which may also provide a trailing and/or leading gap, as shown in FIGS. 6E-6F), a trailing shield 604, non-magnetic layers 622, and side shields 606. The side shields 606 may include a multilayered structure which comprises multiple layers, such as an inner layer 608 and an outer layer 610 (at least two layers, but possibly more in an alternating arrangement, such as three, four, six, eight, 20, etc., as would be apparent to one of skill in the art upon reading the present descriptions), separated by the non-magnetic layer 622. The multiple layers 608, 610 may be preferably comprised of materials having a different saturation magnetization (Ms) in an orientation where the inner layer 608 has a higher Ms than the outer layer 610, in one approach.

In one embodiment, the inner layer 608 may be comprised of a high saturated magnetic flux density (Bs) magnetic material, while the outer layer 610 may be comprised of a low Bs magnetic material or a non-magnetic material (possibly of the same type used for non-magnetic layer 622), of types known to one of skill in the art.

The structure 660 is able to achieve the desired results of high trailing shield 604 permeability due in part to the magnetization of the inner layer 608 facing in the down-track direction due to the reverse magnetic field. With structure 660, the effect is obtained regardless of the magnitude relation of the saturated magnetic flux density of the inner layer 608 and the outer layer 610 due to the reverse magnetic field generated between the non-magnetic layer 622 and the side shield 606, according to one embodiment.

According to another embodiment (not shown) the inner layer 608 may be separated from the trailing shield 604 by a portion of the outer layer 610.

Moreover, as shown in FIG. 6F, a structure 670 is able to achieve the desired results of high trailing shield 604 permeability since the magnetization of the inner layer 614 faces the down-track direction due to the reverse magnetic field even with the non-magnetic layer 624 being present between the inner layer 614 and the outer layer 616. With this structure 670, the desired effects are obtained regardless of the magnitude relation of the saturated magnetic flux density of the inner layer 614 and the outer layer 616 due to the reverse magnetic field generated between the non-magnetic layer 624 and the side/leading shield 612.

Furthermore, as previously described to some extent, a side shield (or side/leading shield) that comprises a laminated structure for the inner layer/outer layer arrangement may also achieve the desired results. A significant effect can be obtained over a wide area with the magnetization of the side shield facing the down-track direction over a number of laminated layers, due to the described structures, according to various embodiments.

Figure 7A:
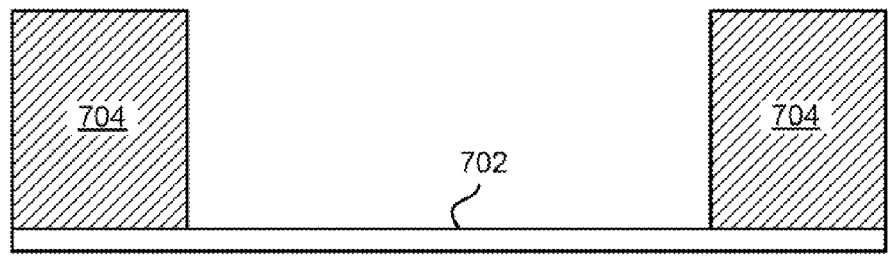
FIGS. 7A-7P show various structures manufactured according to a method, in one embodiment.
Figure 7B:
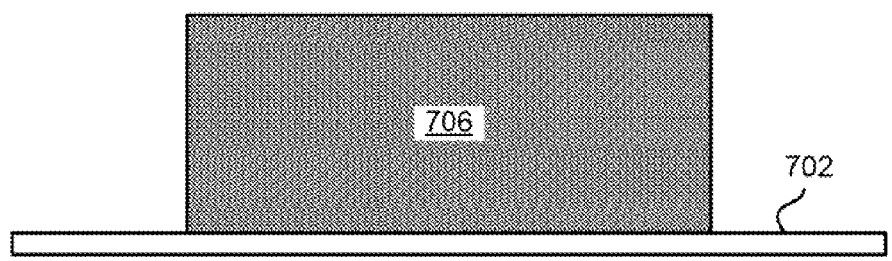
Figure 7C:
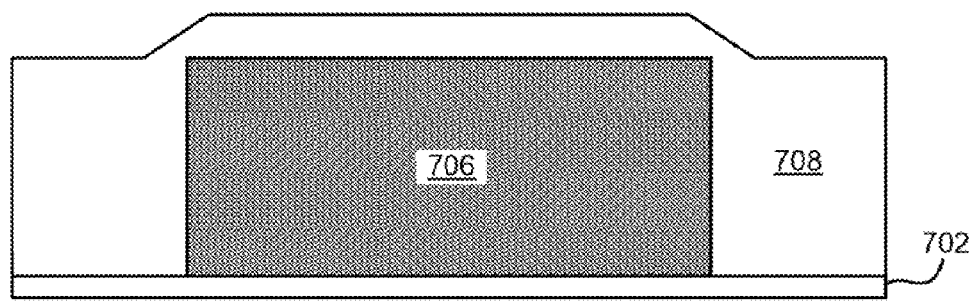
Figure 7D:
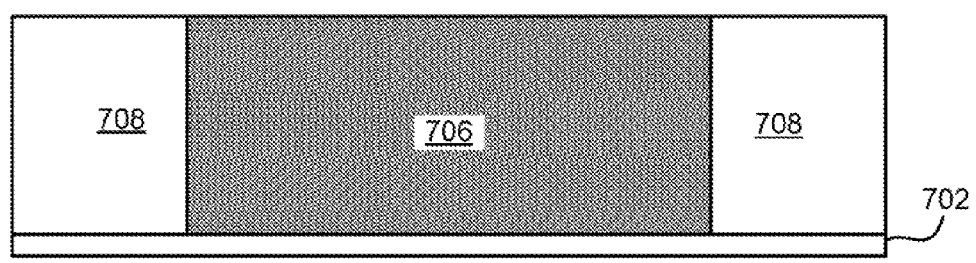
Figure 7E:
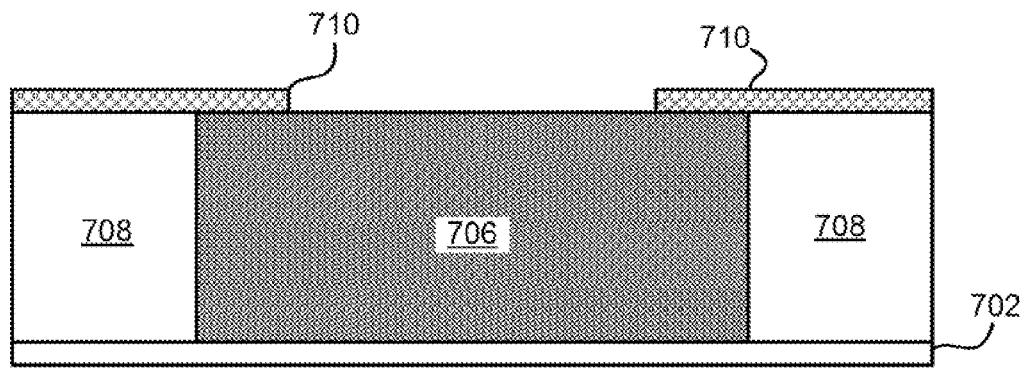
Figure 7F:
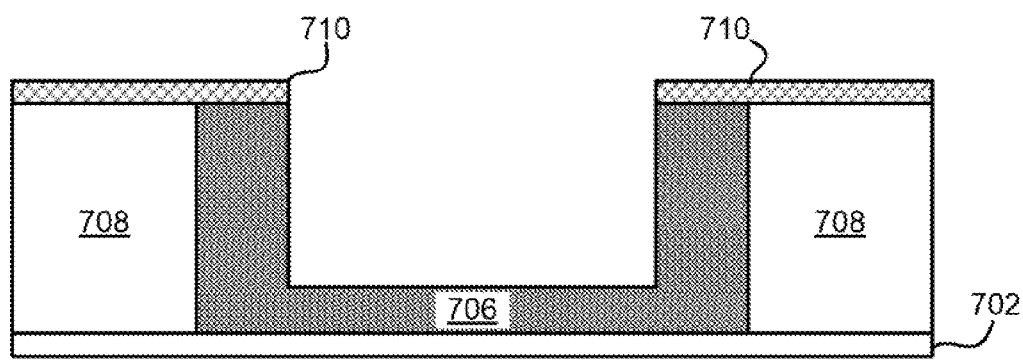
Figure 7G:
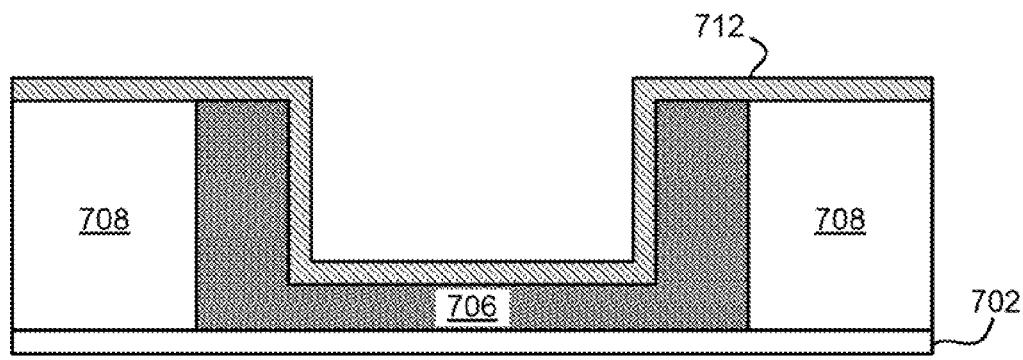
Figure 7H:
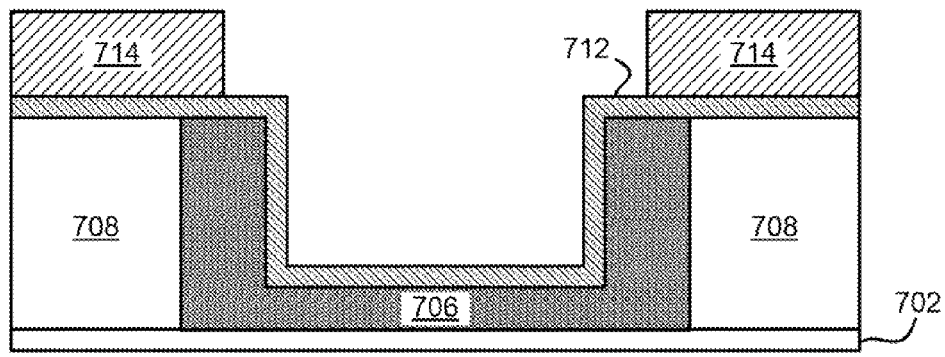
Figure 7I:
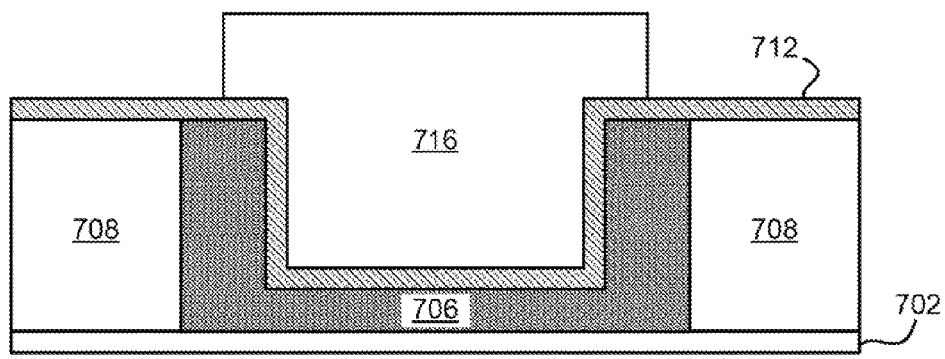
Figure 7J:
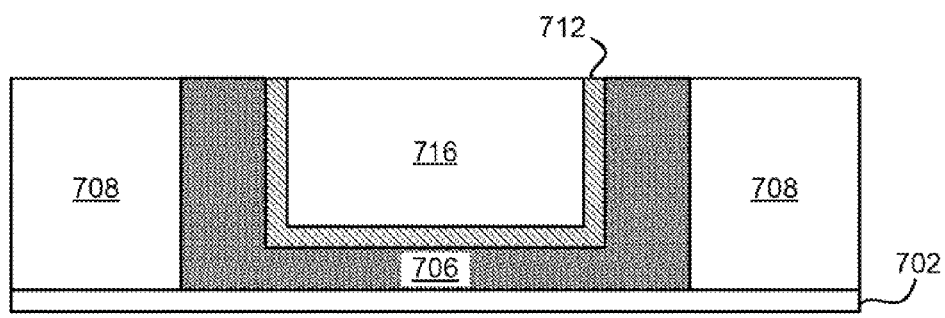
Figure 7K:
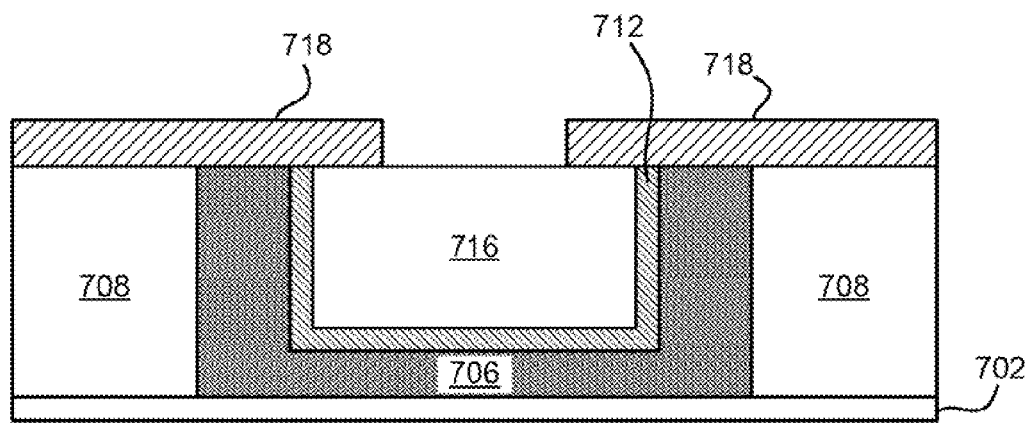
Figure 7L:
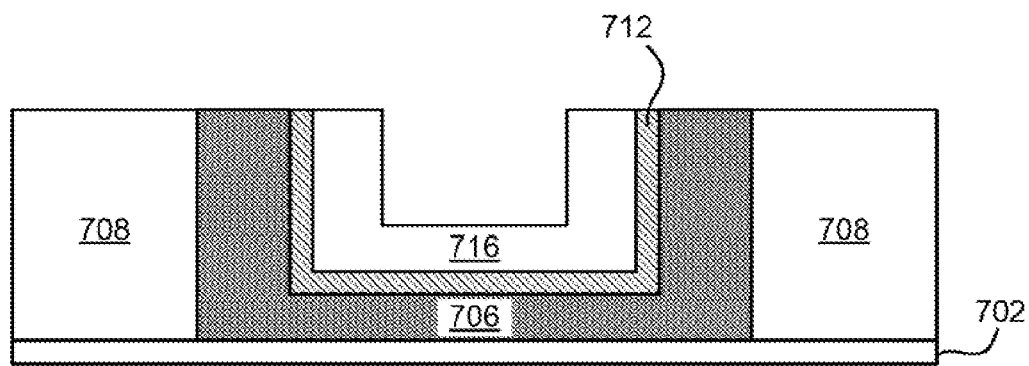
Figure 7M:
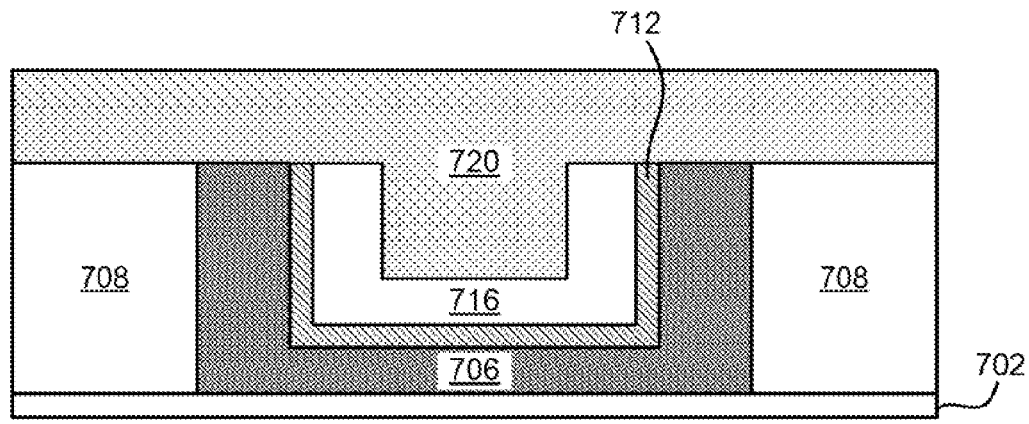
Figure 7N:
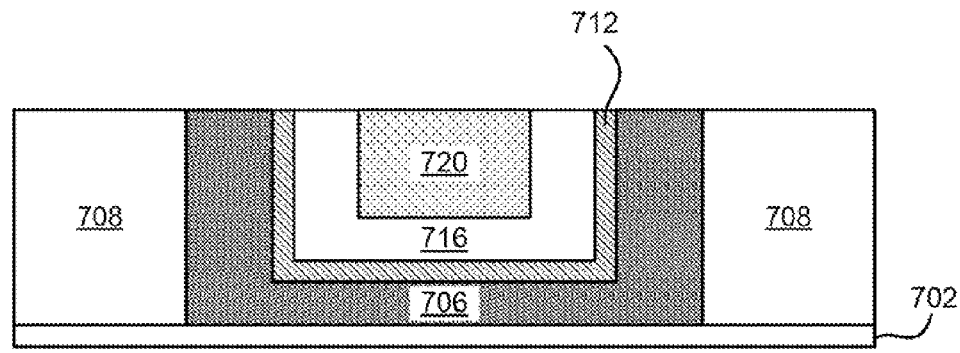
Figure 7O:
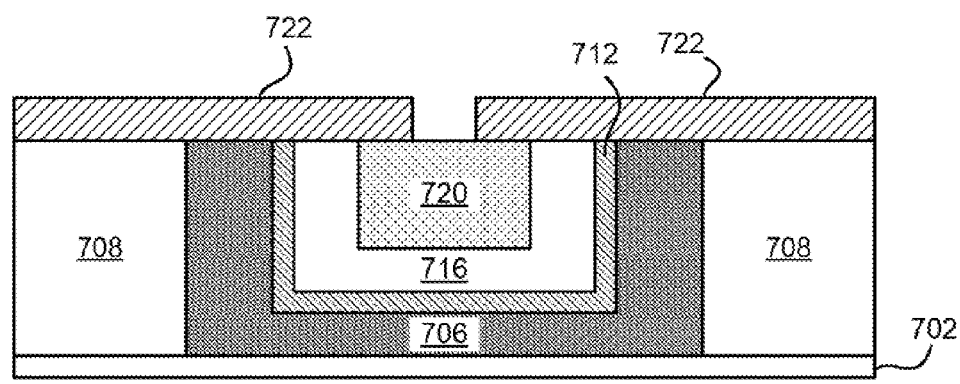
Figure 7P:
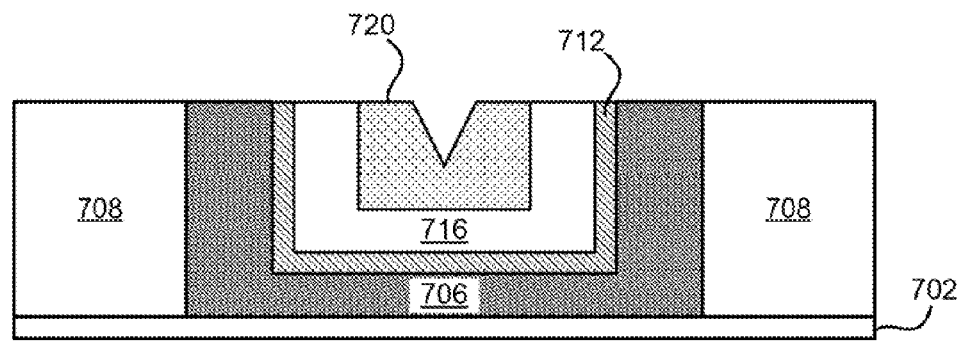

Now referring to FIGS. 7A-7P, a flow of a method of manufacturing a perpendicular magnetic head according to the structure shown in FIG. 6B is shown according to one preferred embodiment. Although specific processes and approaches are described below, any methods known by one of skill in the art may be used in place of any of the processes and approaches described in relation to forming a specific structure. The method may be carried out in any desired environment, and may include more or less operations than those described below.

In FIG. 7A, an inorganic insulating substrate 702 is coated and masked with a photoresist material 704 on either side of an area of the substrate 702 using any method known in the art, thereby leaving a gap for subsequent formation of an outer side/leading shield of the magnetic head.

In FIG. 7B, a magnetic body 706 is deposited onto the substrate 702 in the gap using any method known in the art, such as plating. Next, the photoresist material 704 is removed using any method known in the art, such as etching, dissolution, etc. According to some embodiments, the magnetic body 706 may comprise any magnetic material, such as FeNiCo, FeCo, FeNi, CoNi, etc. The magnetic body 706 may subsequently be used as an outer side/leading shield, according to one embodiment.

As shown in FIG. 7C, an insulating layer 708, which may comprise alumina ($Al_2O_3$) or the like, is deposited onto the magnetic body 706 and exposed portions of the substrate 702 using any method known in the art, such as vacuum depositing via sputtering. This insulating layer 708 may form a gap layer surrounding the subsequently formed structures of the magnetic head.

Referring to FIG. 7D, the insulating layer 708 and magnetic body 706 are polishing, flattened, or planarized using any method known in the art, such as chemical mechanical polishing (CMP) or the like.

In FIG. 7E, a mask material 710 is subsequently formed on the magnetic body 706 using any method known in the art, leaving a gap above the magnetic body 706. The mask material 710 may comprise any material capable of resistance to ion milling, reactive ion etching (RIE), or the like, as known in the art.

As shown in FIG. 7F, ion milling, RIE, or any other method as known in the art is used to form a groove in the magnetic body 706. The groove, according to one embodiment, forms the shape of the outer side/leading shield of the completed magnetic head.

Thereafter, in FIG. 7G, the mask material 710 is removed using any method known in the art and a seed layer 712 is deposited above surfaces of the magnetic body 706 and the insulating layer 708 using any method known in the art, such as vacuum depositing via sputtering, plasma vapor deposition (PVD), etc. The seed layer 712 may be deposited on all exposed surfaces of the structure (as shown) or only in the groove formed in the magnetic body 706. The seed layer 712 may comprise any suitable material as known in the art, such as FeNiCo, FeCo, FeNi, CoNi, etc.

As shown in FIG. 7H, photoresist material 714 is deposited and patterned above a portion of the magnetic body 706 and the insulating layer 708 leaving a gap between the photoresist material 714. Any method known in the art may be used to form the photoresist material 714. In a subsequent step, the gap above the inner portion of the magnetic body 706 may be used to form an inner layer of the side/leading shield, according to one approach.

In FIG. 7I, a second magnetic body 716 is deposited above an inner portion of the seed layer 712 via any method known in the art, such as plating, sputtering, PVD, etc., and then the photoresist material 714 is removed, using any method known in the art. The second magnetic body 716 may be comprised of any magnetic material, such as FeNiCo, FeCo, FeNi, CoNi, etc. The second magnetic body 716 may form the inner layer of the side/leading shield in the completed magnetic head.

As shown in FIG. 7J, the magnetic body 706, the insulating layer 708, and the second magnetic body 716 are polished and/or planarized using any method known in the art, such as CMP.

Next, as shown in FIG. 7K, photoresist material 718 is deposited or coated above the structure leaving a gap in the middle. Etching, milling, RIE, etc., or any other method known in the art is used to form a groove in the second magnetic body 716 where the second magnetic body 716 is exposed (e.g., not covered by the photoresist material 718). Then, the photoresist material 718 is removed to produce a structure as shown in FIG. 7L, according to one embodiment. Any method known in the art may be used to remove the photoresist material 718.

Next, a second insulating layer 720 is deposited above the structure shown in FIG. 7L, resulting in the structure shown in FIG. 7M, according to one embodiment. The second insulating layer 720 may be formed using any method known in the art, such as vacuum depositing via sputtering, plating, PVD, etc. According to one approach, the second insulating layer 720 may be deposited only in the groove formed in the second magnetic body 716.

Now referring to FIG. 7N, the magnetic body 716, second insulating layer 720, and the rest of the structure is flattened, planarized, or polished using any method known in the art, such as CMP.

Next, as shown in FIG. 7O, photoresist material 722 is deposited or coated above the structure leaving a gap in the middle. Etching, milling, RIE, etc., or any other method known in the art is used to form a groove (possibly in a "V"-shape) in the second insulating layer 720 where the second insulating layer 720 is exposed (e.g., not covered by the photoresist material 722), thereby forming the structure shown in FIG. 7P, according to one embodiment.

Using the structure shown in FIG. 7P, conventional magnetic head fabrication techniques may be applied to complete manufacturing of a magnetic head, according to one embodiment. Subsequent steps may include gap formation and main pole formation, among others.

For example, a seed layer may be deposited on the structure shown in FIG. 7P, followed by a photoresist material, and then a magnetic body which will become the main magnetic pole of the completed magnetic head. The main magnetic pole may be comprised of any suitable material as known in the art, such as FeNiCo, FeCo, FeNi, CoNi, etc. Thereafter, the structure is planarized, flattened, or polished using any method, such as CMP. Thereafter, another insulating layer is formed and planarized, and then a trailing shield is deposited above the structure.

It should be noted that methodology presented herein for at least some of the various embodiments may be implemented, in whole or in part, in computer hardware, software, by hand, using specialty equipment, etc., and combinations thereof.

Also, any of these embodiments may be implemented in a magnetic data storage system such as a disk drive system, which may include a magnetic head, a slider for supporting the head, a drive mechanism for passing a magnetic medium (e.g., hard disk) over the head, and a control unit electrically coupled to the head for controlling operation of the head.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic head, comprising:
   a main magnetic pole;
   a trailing shield;
   a multilayered side shield disposed on either side of the main magnetic pole in a cross-track direction, the side shield comprising:
      an inner layer nearer to the main magnetic pole; and
      an outer layer farther from the main magnetic pole than the inner layer;
   wherein the inner layer has a saturation magnetization (Ms) that is greater than a Ms of the outer layer, and
   wherein the trailing shield has a relative permeability of greater than about 50.

2. The perpendicular magnetic head as recited in claim 1, wherein a ratio of the Ms of the outer layer (OMs) over the Ms of the inner layer (IMs) is no more than about 0.5 (OMs/IMs≦~0.5).

3. The perpendicular magnetic head as recited in claim 1, wherein a ratio of a saturated magnetic flux density (Bs) of the outer layer (OBs) over the Bs of the inner layer (IBs) is no more than about 0.5 (OBs/IBs≦~0.5).

4. The perpendicular magnetic head as recited in claim 1, wherein a ratio of a width (W) of the inner layer in a cross-track direction over a height (H) of the inner layer in a down-track direction is no more than about 1.0 (W/H≦~1.0).

5. The perpendicular magnetic head as recited in claim 1, wherein a ratio of the Ms of the outer layer (OMs) over the Ms of the inner layer (IMs) is no more than about 0.5 (OMs/IMs≦~0.5), wherein a ratio of a saturated magnetic flux density (Bs) of the outer layer (OBs) over the Bs of the inner layer (IBs) is no more than about 0.5 (OBs/IBs≦~0.5), and wherein a ratio of a width (W) of the inner layer in a cross-track direction over a height (H) of the inner layer in a down-track direction is no more than about 1.0 (W/H≦~1.0).

6. The perpendicular magnetic head as recited in claim 1, further comprising a non-magnetic layer positioned between the inner layer and the outer layer.

7. A magnetic data storage system, comprising:
   at least one perpendicular magnetic head as recited in claim 1;
   a magnetic medium;
   a drive mechanism for passing the magnetic medium over the at least one perpendicular magnetic head; and
   a controller electrically coupled to the at least one perpendicular magnetic head for controlling operation of the at least one perpendicular magnetic head.

8. A perpendicular magnetic head, comprising:
   a main magnetic pole;
   a trailing shield;
   a multilayered side/leading shield disposed on a leading side of the main magnetic pole in a down-track direction and on either side of the main magnetic pole in a cross-track direction, the side/leading shield comprising:
      an inner layer nearer to the main magnetic pole which surrounds the main magnetic pole on three sides; and
      an outer layer farther from the main magnetic pole than the inner layer which surrounds the main magnetic pole and inner layer on three sides;
   wherein the inner layer has a saturation magnetization (Ms) that is greater than a Ms of the outer layer, and
   wherein the trailing shield has a relative permeability of greater than about 50.

9. The perpendicular magnetic head as recited in claim 8, wherein a ratio of the Ms of the outer layer (OMs) over the Ms of the inner layer (IMs) is no more than about 0.8 (OMs/IMs≦~0.8).

10. The perpendicular magnetic head as recited in claim 8, wherein a ratio of a saturated magnetic flux density (Bs) of the outer layer (OBs) over a Bs of the inner layer (IBs) is no more than about 0.8 (OBs/IBs≦~0.8).

11. The perpendicular magnetic head as recited in claim 8, wherein a ratio of a width (W) in a cross-track direction of a portion of the inner layer that is disposed on either side of the main magnetic pole over a height (H) in a down-track direction of a portion of the inner layer that is disposed on either side of the main magnetic pole is no more than about 2.0 (W/H≦~2.0).

12. A magnetic data storage system, comprising:
at least one perpendicular magnetic head as recited in claim 8;
a magnetic medium;
a drive mechanism for passing the magnetic medium over the at least one perpendicular magnetic head; and
a controller electrically coupled to the at least one perpendicular magnetic head for controlling operation of the at least one perpendicular magnetic head.

13. A perpendicular magnetic head, comprising:
a main magnetic pole;
a trailing shield;
a multilayered side shield having more than two layers such that a layer nearer to the main magnetic pole has a saturation magnetization (Ms) that is greater than a Ms of a layer farther from the main magnetic pole,
wherein a ratio of a width (W) in a cross-track direction of a portion of the layer nearer to the main magnetic pole that is disposed on either side of the main magnetic pole over a height (H) in a down-track direction of the portion of the layer nearer to the main magnetic pole that is disposed on either side of the main magnetic pole is no more than about 2.0 (W/H≦~2.0), and
wherein the trailing shield has a relative permeability of greater than about 50.

14. The perpendicular magnetic head as recited in claim 13, wherein the multilayered side shield is disposed on either side of the main magnetic pole in a cross-track direction, and wherein a ratio of the Ms of the layer farther from the main magnetic pole (FMs) over the Ms of the layer nearer to the main magnetic pole (NMs) is no more than about 0.5 (FMs/NMs≦~0.5).

15. The perpendicular magnetic head as recited in claim 13, wherein the multilayered side shield is disposed on a leading side of the main magnetic pole in a down-track direction and on either side of the main magnetic pole in a cross-track direction, wherein each layer of the multilayered side shield surrounds the main magnetic pole on three sides, and wherein a ratio of the Ms of the layer farther from the main magnetic pole (FMs) over the Ms of the layer nearer to the main magnetic pole (NMs) is no more than about 0.8 (FMs/NMs≦~0.8).

16. A method of forming a perpendicular magnetic head, comprising:
forming side gap layers separated from each other on a substrate;
forming an outer side shield in a gap provided between the side gap layers;
forming a groove in a central portion of the outer side shield;
forming an inner side shield in the groove of the outer side shield; and
forming a groove in a central portion of the inner side shield,
wherein the inner and outer side shields act as a side/leading shield, and
wherein the inner side shield has a saturation magnetization (Ms) that is greater than a Ms of the outer side shield.

17. The method of forming a perpendicular magnetic head as recited in claim 16, wherein the substrate comprises an inorganic insulating material.

18. The method of forming a perpendicular magnetic head as recited in claim 16, wherein the outer and inner side shields comprise a material selected from a group consisting of: FeNiCo, FeCo, FeNi, and CoNi.

19. The method of forming a perpendicular magnetic head as recited in claim 16, further comprising forming an insulating layer between the outer side shield and the inner side shield.

20. The method of forming a perpendicular magnetic head as recited in claim 16, further comprising:
forming a second insulating layer above the inner side shield in the groove of the inner side shield; and
forming a main magnetic pole in the groove of the inner side shield above the second insulating layer.

21. The method of forming a perpendicular magnetic head as recited in claim 20, further comprising forming a trailing shield above the main magnetic pole, the inner side shield, and the outer side shield, wherein the trailing shield has a relative permeability of greater than about 50.

22. The method of forming a perpendicular magnetic head as recited in claim 20, wherein a ratio of a width (W) in a cross-track direction of a portion of the inner side shield that is disposed on either side of the main magnetic pole over a height (H) in a down-track direction of a portion of the inner side shield that is disposed on either side of the main magnetic pole is no more than about 2.0 (W/H≦~2.0).

23. The method of forming a perpendicular magnetic head as recited in claim 16, further comprising forming a seed layer below the inner side shield for providing a surface with which to form the inner side shield.

24. The method of forming a perpendicular magnetic head as recited in claim 16, wherein a ratio of the Ms of the outer side shield (OMs) over the Ms Of the inner side shield (IMs) is no more than about 0.8 (OMs/IMs≦~0.8), and wherein a ratio of a saturated magnetic flux density (Bs) of the outer side shield (OBs) over a Bs of the inner side shield (IBs) is no more than about 0.8 (OBs/IBs≦~0.8).

25. A method of forming a perpendicular magnetic head, comprising:
forming two side gap layers separated from each other on a substrate;
forming two outer side shields adjacent the side gap layers in a gap provided between the side gap layers;
forming two inner side shields near the outer side shields;
forming a main magnetic pole between the inner side shields; and
forming a trailing shield above the main magnetic pole, the inner side shield, and the outer side shield,
wherein the trailing shield has a relative permeability of greater than about 50,
wherein a ratio of a width (W) in a cross-track direction of the inner side shield that is disposed on either side of the main magnetic pole over a height (H) in a down-track direction of the inner side shield that is disposed on either side of the main magnetic pole is no more than about 1.0 (W/H≦~1.0), and
wherein a ratio of an Ms of the outer side shield (OMs) over an Ms of the inner side shield (IMs) is no more than about 0.5 (OMs/IMs≦~0.5).

* * * * *

UNITED STATES PATENT AND TRADEMARK OFFICE
CERTIFICATE OF CORRECTION

PATENT NO.        : 8,254,059 B2                                Page 1 of 1
APPLICATION NO.   : 12/961421
DATED             : August 28, 2012
INVENTOR(S)       : Horide et al.

It is certified that error appears in the above-identified patent and that said Letters Patent is hereby corrected as shown below:

In the specification:

col. 1, line 15 replace "(HOD)" with --(HDD)--;

col. 5, line 49 replace "11.3" with --113--.

In the claims:

col. 16, line 39 replace "Of" with --of--.

Signed and Sealed this
Sixth Day of November, 2012

David J. Kappos
*Director of the United States Patent and Trademark Office*